United States Patent [19]
Golan

[11] 3,822,770
[45] July 9, 1974

[54] SPEED SENSITIVE CONTROL SYSTEM FOR SLIPPING CLUTCH

[75] Inventor: Kenneth F. Golan, Pekin, Ill.

[73] Assignee: Caterpillar Tractor Co., Peoria, Ill.

[22] Filed: May 8, 1972

[21] Appl. No.: 251,101

[52] U.S. Cl.......... 192/103 F, 192/3.33, 192/106 F, 192/113 B, 137/49
[51] Int. Cl........................................ F16d 43/284
[58] Field of Search............ 192/3.33, 104 F, 103 F, 192/103 FA, 105 F

[56] References Cited
UNITED STATES PATENTS

| | | | |
|---|---|---|---|
| 2,619,978 | 12/1952 | Grandgirard | 192/103 FA |
| 3,101,012 | 8/1963 | Christenson et al. | 192/104 F |
| 3,202,018 | 8/1965 | Hilpert | 192/104 F |
| 3,352,395 | 11/1967 | Hilpert | 192/104 F |
| 3,384,209 | 5/1968 | Murphy | 192/3.33 |
| 3,424,029 | 1/1969 | Horsch et al. | 192/103 FA |
| 3,659,690 | 5/1972 | Kitano et al. | 192/3.33 |

Primary Examiner—Benjamin W. Wyche
Attorney, Agent, or Firm—Phillips, Moore, Weissenberger, Lempio & Strabala

[57] ABSTRACT

A control system for regulating a hydraulically actuated variable coupling or slipping clutch in a drive train including a source of fluid under pressure, a reducing valve for adjustably communicating the source with the clutch, a speed sensor in the drive train to which the reducing valve is responsive, and a manual control for selectively biasing response of the valve to the speed sensor. The speed sensor preferably comprises a pitot tube arranged to develop fluid pressure in proportion to rotating speed of a part of the drive train. In a preferred embodiment, the drive train has a torque converter with an input shaft coupled to a prime mover and auxiliary driven equipment, the variable coupling or slipping clutch being adapted to vary torque absorption capacity of the torque converter.

4 Claims, 5 Drawing Figures

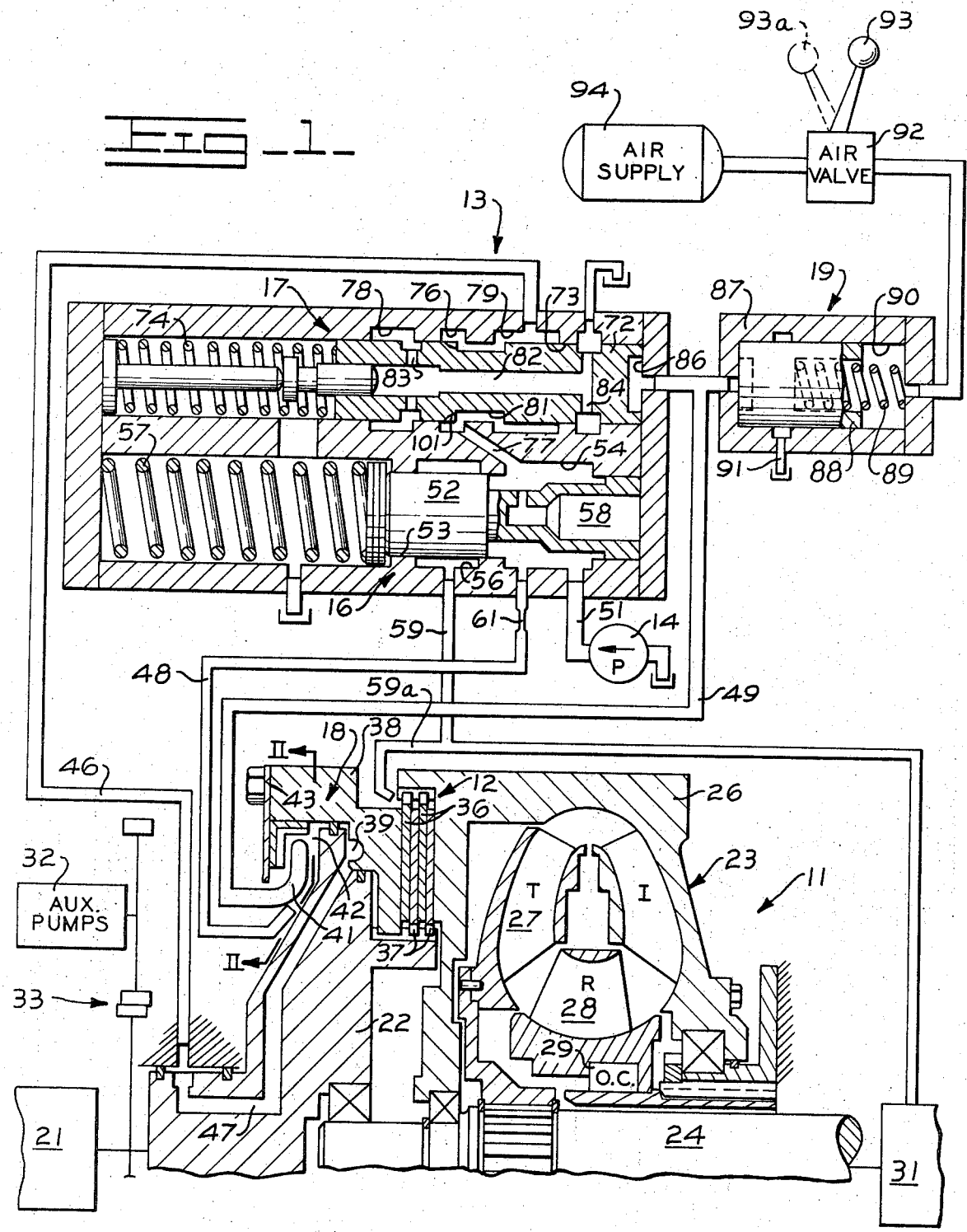

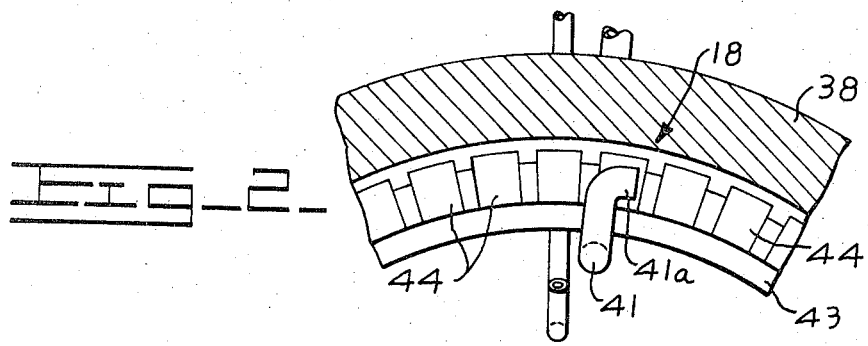
Fig-2-
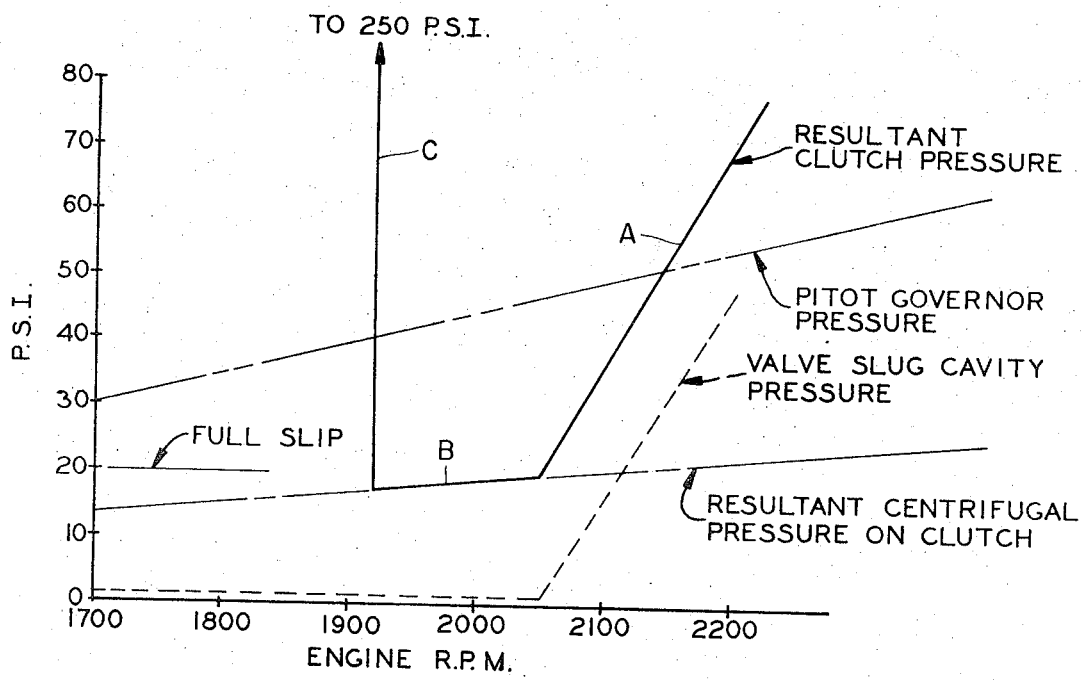
Fig-3-

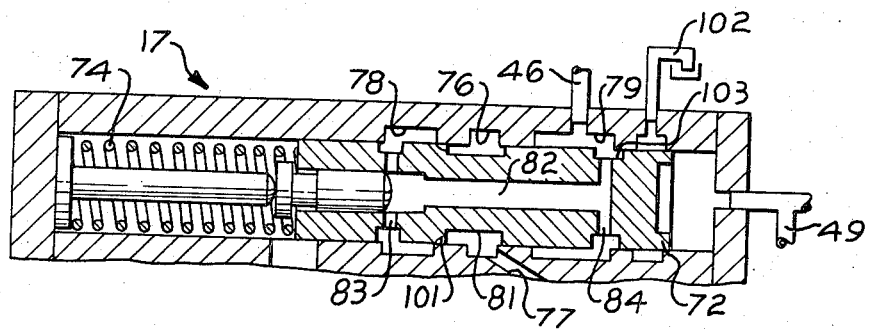
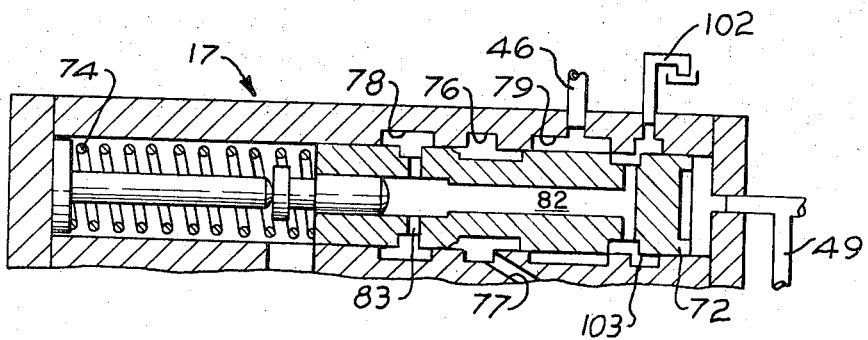

SPEED SENSITIVE CONTROL SYSTEM FOR SLIPPING CLUTCH

BACKGROUND OF THE INVENTION

Variable torque transmission is often desirable in drive trains with the level of torque transmission being proportional to operating speed of a member in the drive train. Variable torque transmission may be established, for example, by hydraulically actuated means such as a slipping clutch arranged to provide a variable coupling in a drive train or to regulate torque absorption capacity of a torque converter. A variable torque transmitting coupling may, of course, also be embodied in a torque converter having variable blading associated with one of its rotating elements, for example.

Variable torque drive trains of this type may be employed in earthmoving vehicles or marine gear where a primary output shaft provides propulsion power and a branched portion of the drive train provides power for auxiliary equipment. When both propulsion and auxiliary power requirements may be substantial relative to available power from a single engine or prime mover, a variable coupling is commonly employed in the drive train to achieve priority over available power for either the primary output shaft or the auxiliary equipment.

A typical vehicle having such requirements is a loader vehicle where the primary output shaft is coupled through a suitable transmission to driven ground wheels for the vehicle. Auxiliary equipment driven by the loader vehicle engine includes one or more hydarulic pumps directly coupled with the engine. These pumps provide hydraulic fluid for operating various jacks which in turn position a bucket movably mounted on the vehicle.

In vehicles of this type, it is impractical to size the vehicle engine or prime mover to meet maximum requirements of the vehicle ground wheels and auxiliary equipment at the same time. Accordingly, as noted above, variable torque transmitting means have been employed to selectively regulate torque transmission through at least a portion of the drive train. However, control systems providing adequate regulation over the variable torque transmitting means have tended to be relatively complex and to often require periodical adjustment for effective operation.

SUMMARY OF THE INVENTION

Accordingly, one object of the present invention is to provide a simple and reliable hydraulic control system which is responsive to operate speed of a rotating member in a drive train for regulating variable torque transmitting means such as a slipping clutch. A speed sensing means delivers a pilot signal to which a control valve is responsive for communicating actuating fluid pressure to the variable torque transmitting means. In one embodiment of the invention, the speed sensing means comprises a pitot tube arranged in an annular fluid chamber adjacent a rotating member in the drive train.

A further object is to provide such a control system further permitting an operator to readily limit operation of the variable torque transmitting means. This is accomplished within the combination set forth immediately above by associating manually operable biasing means with the control valve to bias the pilot signal from the speed sensing means.

It is a further object to adapt such a control system for use in a branched drive train wherein the variable torque transmitting means is employed to establish torque transmission priority in one branch of the drive train. In one embodiment of the present invention suited for this purpose, the speed sensing means is responsive to rotating speed of a drive train member on the input side of the variable torque transmitting means so that operating speed of a single prime mover or engine in the drive train is maintained within selected limits.

Other objects and advantages of the present invention are made apparent in the following description, having reference to the accompanying drawings.

DESCRIPTION OF THE DRAWINGS

In the drawings:

FIG. 1 is a partially schematic and partially sectioned view of a drive train and a control system constructed according to the present invention for operating a variable torque transmitting means or slipping clutch in the drive train;

FIG. 2 is an enlarged view taken along sectioned line II—II of FIG. 1 to illustrate part of a speed sensing means in the control system;

FIG. 3 is a graphical representation of various operating pressures or levels in the control system of FIG. 1;

FIGS. 4 – 5 are fragmentary view of a valve within the control system illustrating its position during various operating conditions.

DESCRIPTION OF THE PREFERRED EMBODIMENT

Referring now to FIG. 1, the present invention generally relates to a drive train of the type indicated at 11 and including a variable torque transmitting means such as the slipping clutch 12. A control system 13 for regulating operation of the slipping clutch 12 includes a pump or source of fluid under pressure 14, a relief valve 16 for adjusting output fluid pressure from the pump 14 and a reducing valve 17 for selectively communicating fluid pressure to actuate the slipping clutch 12. As described in greater detail below, the reducing valve 17 is normally responsive to a pilot signal from a speed sensing means 18. Biasing means 19 is manually operable to bias the pilot signal to which the reducing valve 17 is normally responsive. Through such an arrangement, the degree of engagement of torque transmitting capacity of the slipping clutch 12 may be made proportional to operating speed of a member in the drive train. The manually operable biasing means 19 permits an operator to selectively limit the engagement or torque transmitting function of the slipping clutch.

To describe the present invention in greater detail, the drive train 11 includes an engine or prime mover 21 having a flywheel 22 providing a power input for a torque converter 23. The torque converter 23 is of a generally conventional type including a plurality of rotating parts providing a fluid coupling for an output shaft 24. As shown in FIG. 1, the slipping clutch 12 provides a variable coupling between the flywheel 22 and an impeller or pump element 26 of the torque converter 23. A turbine member 27 of the torque converter is directly coupled to the output shaft 24 while rotation of a stator or reactor element 28 in the torque converter may be controlled through an overrunning clutch indicated at 29.

The output shaft 24 is coupled through a suitable transmission indicated generally at 31 which in turn may be coupled to driven wheels (not shown) of a vehicle to provide primary propulsion power. Auxiliary equipment having at least momentary power requirements which are substantial relative to available power from the engine 21 is represented by one or more hydraulic pumps indicated at 32. The pumps 32 are coupled directly to the engine 21 through a drive gear arrangement 33 so that power from the engine 21 is always available to drive the pumps 32.

The slipping clutch 12 provides a means for adjusting power requirements placed on the engine 21 by the primary output shaft 24. Thus, the slipping clutch 12 may be fully engaged when the engine 21 is delivering adequate power for both the auxiliary equipment and the output shaft 24. However, when the engine 21 is not delivering adequate power for both the output shaft 24 and the auxiliary pumps 32, this condition is indicated by reducing speed of the engine 21. The degree of engagement for torque transmitting capacity of the slipping clutch 12 may be accordingly reduced to assure priority in the auxiliary pumps 32 over available power from the engine 21. The control system 13 functions to regulate engagement of the slipping clutch 12 in a manner described in greater detail below for proportioning power from the engine 21 to the auxiliary pumps 32 and the primary output shaft 24.

Before describing the control system 13, a preferred construction of the slipping clutch 12 and speed sensing means 18 is described immediately below with these components interacting to balance centrifugal forces which would otherwise tend to cause engagement of the slipping clutch 12. The slipping clutch 12 includes a plurality of reactor plates 36 which are splined to the converter impeller element and rotatable housing 26. A plurality of friction discs 37 are intermeshed with the reactor plates and are splined to the flywheel 22. A piston member 38 is arranged for rotation with the flywheel 22 while being axially movable in response to fluid pressure developed in an actuating chamber 39 for urging the reactor plates and friction discs of the clutch 12 into variable engagement with each other, thus causing the impeller element 26 to rotate with the flywheel 22 or at a porportional speed thereof.

The speed sensor 18, which is also illustrated in FIG. 2, comprises a stationary pitot tube 41 having an open end 41a arranged in circumferentially facing relation within an annular fluid chamber 42 formed by the flywheel 22 and the piston 38. Referring also to FIG. 2, an annular dam 43 is secured to the piston 38. A plurality of blades 44 secured to the dam wall stabilize a pressure head within the annular chamber 42 is arranged in opposition to the actuating chamber 39 for the slipping clutch 12. By proper sizing of components, fluid pressures within these two chambers will balance or cancel each other so that the piston 38 does not tend to be operated by centrifugal forces.

Fluid pressure is communicated to the actuating chamber 39 for the slipping clutch 12 by a conduit 46 and a passage 47 formed within the flywheel 22. Fluid is communicated into the annular chamber 42 by conduit 48 and the pitot tube 41 is in communication with a conduit 49. The conduits 46, 48 and 49 are in communication with the control system 13 as described in greater detail below. It is noted that as the operating speed of the flywheel 22 increases, increasing pressure results within the pitot tube 41 and this variable fluid pressure is communicated to the reducing valve 17 as a pilot signal through the conduit 49.

Referring now to the control system 13, fluid under pressure from the pump 14 is communicated to the relief valve 16 by a conduit 51. The relief valve 16 includes a spool 52 slidably arranged within a bore 53, the bore 53 including an annular recess 54 in communication with the conduit 51 and another annular recess 56. The relief valve spool 52 tends to be shifted in a rightward direction by a spring 57. Fluid pressure communicated to the relief valve through the conduit 51 passes into an internal chamber 58 within the relief spool 52, causing the spool 52 to be shifted leftwardly against the spring 57 and allowing fluid from the annular recess 54 to be communicated into a conduit 59. The relief valve is selected to provide an optimum fluid pressure, for example, 250 PSI within the annular recess 54 while the pump 14 is capable of supplying fluid pressure in excess of that value. Fluid communicated into the conduit 59 by the relief valve provides lubrication fluid for the transmission unit 31 while a branch 59a of the conduit 59 directs fluid onto the slipping clutch 12 for cooling. Fluid from the annular recess 54 is also communicated into the conduit 48 across a restrictive orifice 61 to provide and maintain a supply of fluid within the annular chamber 42.

The reducing valve 17 includes a spool 72 slidably arranged within a bore 73 and urged in a rightward direction by a spring 74. The valve bore 73 includes an annular recess 76 in communication with the annular recess 54 for the relief valve 16 by means of a passage 77 with annular recesses 78 and 79 being formed along the bore 73 in spaced apart relation from the recess 76. The reducing valve spool 72 is formed with an annular groove 81 which communicates the annular recesses 76 and 79 when the spool 72 is shifted completely to the right, as viewed in FIG. 1. The spool has an axially formed internal passage 82 in communication with cross-drilled passages 83 and 84 which function in a manner described in greater detail below for regulating fluid communication to the slipping clutch 12 through the conduit 46.

The conduit 49 is in communication with a pilot fluid chamber 86 at the right end of the spool 72. The conduit 49 is also in communication with a relief valve 87 which forms a portion of the manually operable biasing means 19. Within the relief valve 87, a spool 88 is urged in a leftward direction by a spring 89 to block the conduit 49 from a drain passage 91. However, fluid pressure developed within the conduit 49 acts against the spool 88 in opposition to a spring 89 and may eventually shift the spool 88 rightwardly so that the conduit 49 is in communication with the drain passage 91. A manual control 92 has a lever 93 which may be moved to an on position to communicate pneumatic pressure into the spring chamber 90 of the relief valve 87 from an air supply 94.

In operation, the reducing valve spool 72 tends to be shifted rightwardly to a position shown in FIG. 1 during engine start-up and during relatively low speed operation of the engine as illustrated in FIG. 3. For example, the reducing valve 17 may be designed so that the annular groove 81 maintains communication between the annular recesses 76 and 79 up to an engine speed of approximately 1,925 RPM with the full actuating pressure (for example 250 PSI being delivered to the actuating chamber 39 of the slipping clutch 12 through the conduit 46. This allows the engine to drive additional transmission supply pumps (not shown) located between the slipping clutch and the converter as well as the pump 14 of FIG. 1.

Assuming that maximum torque delivery to the primary output shaft 24 is desired, the lever 93 is positioned so that air pressure is blocked from the spring chamber 90. Thus, as the operating speed of the engine exceeds the selected value of 1,925 RPM, an increased pilot signal in the conduit 49 is communicated to the drain 91 before sufficient pressure is developed in the pilot chamber 86 to shift the reducing valve spool 72 to the left. Accordingly, the slipping clutch 12 is maintained in a fully engaged condition so that both the primary output shaft 24 and the auxiliary pumps 32 are rotated or driven with the engine 21.

On the other hand, if the operator desires to establish priority in the auxiliary equipment 32 over available power from the engine 21, the lever 93 is moved to a position shown in broken lines at 93a where increased air pressure would be communicated to the spring chamber 90. Air pressure in the chamber 90 in combination with the spring 89 resists rightward shifting of the relief spool 88 so that an increased pilot signal in the conduit 49 is effective to shift the reducing valve 72 to the left rather than being relieved and communicated to the drain passage 91.

With the manually operated biasing means 19 so conditioned, the reducing valve spool 72 tends to be shifted to the left, as shown in FIG. 4. When the engine reaches a speed (for example, 2,200 RPM), the 70 psi resultant clutch pressure will transmit full engine torque through the slipping clutch to the converter. With the reducing spool 72 in this position, as shown in FIG. 4, fluid from the annular recess 76 is metered to the annular recess 78 by the annular groove 81 in the spool with the fluid then passing through the passage 83, the axial passage 82 and the cross-drilled passage 84 for communication to the slipping clutch through the conduit 46.

During this operational mode, assuming that power requirements from the primary output shaft 24 and the auxiliary equipment 32 exceed available power from the engine 21, the engine would begin to lug down or experience a decreasing speed of operation. The reducing valve 17 is designed to respond to this condition through the speed sensing means 18 to adjust the torque transmission capacity of the clutch 12 and thus assist the engine in maintaining its operating speed within a selected range. For example, if the engine speed were to decrease toward 2,050 RPM, the pilot signal in the conduit 49 would be reduced proportionately and the reducing valve spool 72 would approach the position illustrated in FIG. 4 where the slots 101 are closed from the annular recess. As the reducing valve spool is shifted leftwardly from the position of FIG. 4, fluid from the annular recess 76 is metered to the annular recess 78 by modulating slots 101 formed in the spool 72. Thus, the reducing valve spool 72 closely regulates the degree of engagement for the slipping clutch 12 in response to its operating speed until the engine again recovers its full operating speed of 2,200 RPM. Engagement pressure in the slipping clutch 12 during this mode of operation is indicated by the straight line A of FIG. 3.

If the operating load placed on the engine were more severe and the engine speed should be reduced to within a range of, for example, 1,925 to 2.050 RPM, as indicated by the line B in FIG. 3, the pilot signal in the conduit 49 would be even further reduced. The reducing valve spool would shift further to the right toward a position illustrated in FIG. 5. With the valve spool 72 in this position, the annular recess 76 would be blocked by the spool 72 and the annular recess 79 would be communicated with a fluid drain 102 by an annular groove 103 formed in the spool valve. Thus, the clutch 12 would be placed in a condition of "full slip" during this operating speed range for the engine 21 so that the load on the engine would be minimized and the engine would have an opportunity to recover to a more desirable operating speed range.

The vertical line C in FIG. 3 indicates that the slipping clutch 12 is fully engaged at and below an engine speed of about 1,925 RPM.

A particular advantage of the control system of the present invention is apparent upon noting that operation of the control system may be almost entirely adjusted or calibrated by modification of the reducing valve 17 which may be placed in a readily accessible location.

It is further noted that numerous changes may be made within the combination as described above without parting from the contemplated scope of the present invention. For example, the manually operable biasing means 19 is described above as being pneumatically operable. However, it is readily apparent that the pneumatic portion of the biasing means 19 could readily be replaced by a mechanical equivalent. Accordingly, the scope of the present invention is defined only by the following claims.

What we claim is:

1. In a drive train including a prime mover, an input shaft coupled to the prime mover, a primary output shaft, a hydraulically actuated slipping clutch including an actuating chamber and providing a variable coupling between the input shaft and primary output shaft, and auxiliary motor means coupled for rotation with the input shaft and having variable power requirements which are at least momentarily substantial relative to available power from the prime mover, a control system for the slipping clutch comprising
   a source of fluid under pressure,
   means forming an annular fluid chamber adjacent a rotating member in the drive train on the input side of the slipping clutch,
   pitot means having an inlet opening arranged in circumferentially facing relation in the annular fluid chamber and an outlet passage wherein fluid pressure is proportional to rotating speed of the drive train member,
   valve means communicating the source with the actuating chamber for the slipping clutch, the valve means being in responsive communication with the outlet passage of the pitot means for regulating pressurization of the actuating chamber in the slipping clutch relative to operating speed of the prime mover, and a manually operable biasing means operatively coupled with the valve means for limiting response of the valve means to the pitot means.

2. In a drive train including a prime input shaft coupled with the prime mover, a primary output shaft and a slipping clutch providing a variable coupling between the input shaft and output shaft, the slipping clutch having an actuating fluid chamber for regulating engagement of the slipping clutch, a control system for the slipping clutch comprising a source of fluid under pressure, a control valve providing variable communication along a fluid conduit between the source and the actuating chamber of the slipping clutch, a speed sensing means operatively responsive to rotating speed of a member in the drive train on the input side of the slipping clutch and in communication with the control valve independent of the fluid conduit between the source and slipping clutch actuating chamber, the speed sensing means including means for delivering a pilot signal to which the control valve is responsive, the pilot signal being proportional to rotating speed of the drive train member for causing the control valve to regulate engagement of the slipping clutch in proportion to operating speed of the prime mover, and a manually operable biasing means for limiting response of the control valve to the pilot signal.

3. In a drive train including a prime mover, an input shaft coupled with the prime mover, a primary output shaft and a slipping clutch providing a variable coupling between the input shaft and output shaft, the slipping clutch having an actuating fluid chamber for regulating engagement of the slipping clutch, a control system for the slipping clutch comprising a source of fluid under pressure, a control valve providing variable communication along a fluid conduit between the source and the actuating chamber of the slipping clutch, a speed sensing means operatively responsive to rotating speed of a member in the drive train and in communication with the control valve independent of the fluid conduit between the source and slipping clutch actuating chamber, the speed sensing means including means for delivering a pilot signal to which the control valve is responsive, the pilot signal being proportional to rotating speed of the drive train member, the control valve comprising a relief valve means and a pilot operated reducing valve in series with the source, the pilot operated reducing valve being responsive to the pilot signal from the speed sensing means, and a manually operable biasing means for limiting response of the reducing valve to the pilot signal.

4. The drive train of claim 3 wherein the reducing valve includes means for communicating the source with the actuating chamber of the slipping clutch during relatively slow speed rotation of the drive train member and means for providing metered communication between the source and the actuating chamber of the slipping clutch when rotating speed of the drive train member is within a selected range.

* * * * *